(12) United States Patent
Baltz et al.

(10) Patent No.: US 12,738,069 B2
(45) Date of Patent: Sep. 15, 2026

(54) DETECTION OF CORN HEAD ROW UNIT SLIP CLUTCH DISENGAGEMENT USING PERCEPTION SYSTEM

(71) Applicant: DEERE & COMPANY, Moline, IL (US)

(72) Inventors: Nicholas C. Baltz, Port Byron, IL (US); Chad R. Borkgren, Coal Valley, IL (US); Ashraf Qadir, Ankeny, IA (US); Logan K. Trueblood, Port Byron, IL (US); Duane M. Bomleny, Geneseo, IL (US)

(73) Assignee: Deere & Company, Moline, IL (US)

( * ) Notice: Subject to any disclaimer, the term of this patent is extended or adjusted under 35 U.S.C. 154(b) by 1058 days.

(21) Appl. No.: 17/736,309

(22) Filed: May 4, 2022

(65) Prior Publication Data

US 2023/0360404 A1 Nov. 9, 2023

(51) Int. Cl.

| | |
|---|---|
| ***G06V 20/56*** | (2022.01) |
| ***A01D 45/02*** | (2006.01) |
| ***A01D 69/08*** | (2006.01) |
| ***A01D 75/18*** | (2006.01) |
| ***F16D 7/00*** | (2006.01) |
| ***G06V 10/147*** | (2022.01) |
| ***G07C 5/08*** | (2006.01) |

(52) U.S. Cl.

CPC ........... *G06V 20/56* (2022.01); *A01D 45/021* (2013.01); *A01D 69/08* (2013.01); *A01D 75/182* (2013.01); *F16D 7/00* (2013.01); *G06V 10/147* (2022.01); *G07C 5/0816* (2013.01)

(58) Field of Classification Search

CPC .... G06V 20/56; G06V 10/147; A01D 45/021; A01D 69/08; A01D 75/182; G07C 5/0816

See application file for complete search history.

(56) References Cited

U.S. PATENT DOCUMENTS

| | | | |
|---|---|---|---|
| 6,843,044 | B2 | 1/2005 | Clauss |
| 7,739,861 | B2 | 6/2010 | Mackin |
| 9,301,446 | B2 | 4/2016 | Peters |

(Continued)

FOREIGN PATENT DOCUMENTS

| | | | |
|---|---|---|---|
| DE | 102014109688 | A1 | 1/2016 |
| DE | 102016202628 | A1 | 8/2017 |

(Continued)

*Primary Examiner* — Ig T An

(74) *Attorney, Agent, or Firm* — Taft Stettinius & Hollister LLP; Stephen F. Rost

(57) ABSTRACT

A perception system coupled to a harvesting head that includes row units, and slip clutches configured to couple the row units to a drive shaft and automatically disengage a jammed row unit. The perception system includes vision sensors collecting image data in front of the head, and a processor that processes the image data, and notifies the operator when it detects excessive crop buildup in front of one of the row units based on the image data. The perception processor can activate a notification device, and it can indicate which row unit has the detected crop buildup. The vision sensors can be positioned to have separate or overlapping fields of view covering the row units. A method of collecting image data in front of the row units, processing the image data to detect excessive crop buildup, and notifying the operator of detected buildups.

21 Claims, 3 Drawing Sheets

(56) References Cited

U.S. PATENT DOCUMENTS

| | | | | |
|---|---|---|---|---|
| 10,757,859 | B2 | 9/2020 | Dima et al. | |
| 2011/0191001 | A1* | 8/2011 | Viaud | A01F 15/106 702/182 |
| 2015/0305238 | A1 | 10/2015 | Klausmann et al. | |
| 2017/0082442 | A1 | 3/2017 | Anderson | |
| 2018/0084708 | A1 | 3/2018 | Neitemeier et al. | |
| 2018/0084719 | A1* | 3/2018 | Neitemeier | G01F 1/06 |
| 2018/0249631 | A1* | 9/2018 | Ohms | A01D 82/00 |
| 2019/0307070 | A1 | 10/2019 | Dima et al. | |
| 2019/0327889 | A1 | 10/2019 | Borgstadt | |
| 2020/0068804 | A1 | 3/2020 | Barther et al. | |
| 2020/0084965 | A1 | 3/2020 | Neitemeier et al. | |
| 2020/0100428 | A1* | 4/2020 | Anderson | A01D 41/1271 |
| 2020/0267899 | A1* | 8/2020 | Zielke | A01D 45/021 |
| 2021/0289701 | A1 | 9/2021 | White et al. | |

FOREIGN PATENT DOCUMENTS

| | | | |
|---|---|---|---|
| DE | 102016118227 | A1 | 3/2018 |
| DE | 102016118237 | A1 | 3/2018 |
| DE | 102017129193 | A1 | 6/2019 |
| DE | 102019111089 | A1 | 11/2020 |
| EP | 2084953 | B1 | 8/2009 |
| EP | 2681984 | B1 | 1/2016 |
| EP | 3150055 | A1 | 4/2017 |
| EP | 3299995 | A1 | 3/2018 |
| EP | 3299996 | A1 | 3/2018 |
| EP | 3552474 | A1 | 10/2019 |
| EP | 3556197 | B1 | 10/2019 |
| WO | 2014093794 | A1 | 6/2014 |
| WO | 2014093814 | A1 | 6/2014 |

* cited by examiner

DETECTION OF CORN HEAD ROW UNIT SLIP CLUTCH DISENGAGEMENT USING PERCEPTION SYSTEM

FIELD OF THE DISCLOSURE

The present disclosure relates to agricultural harvesting machines, and more specifically relates to detection of a corn head row unit slip clutch event.

BACKGROUND

Agricultural harvesters can be equipped with a variety of interchangeable gatherer units to suit particular crops or harvesting conditions. Corn heads can be used with base units to permit the harvesting of corn. A corn head is a row crop device and can be equipped with a series of shrouds which function as divider points for guiding plants or stalks into the throats of the respective row units as the harvester advances down the rows of standing crop. The stalks are then guided rearward into the corn head where the stalks are pulled down and corn ears are snapped from the stalks. The corn ears are conveyed further rearward to a trough having a cross auger extending laterally behind and spanning the row units. The auger rotating in the auger trough pulls the ears of corn to a laterally central region of the corn head, and a central conveyor conveys them through a hole on the rear wall of the corn head, then through a feeder house and into the vehicle where the ears are threshed, and the corn kernels cleaned and stored. Many corn heads include optional chopping units for cutting and shredding the corn stalks which may then be left in the field to decompose. Corn heads include a frame, including a toolbar extending across the width of the frame to which row units are attached. The row units are driven by a laterally extending drive shaft that extends through all of the row units.

During normal operation, one or more row units will occasionally become jammed with foreign material and stop operating. When this happens, the drive shaft continues rotating, but is mechanically released from the stopped unit by disengaging a slip clutch that couples the drive shaft to the unit, thereby permitting the drive shaft to continue rotating even though the row unit is jammed. However, since a slipping slip clutch can overheat and cause damage, this clutch slippage cannot be allowed to continue indefinitely. If a jammed row unit condition is not detected, a slip clutch could be damaged or fail in only a few minutes.

An operator may not see when a clutch is slipping, or may have his attention focused on some other aspect of the harvester or the harvesting operation. The row units are disposed underneath the covers or shrouds that guide the corn plants into the row units. Typically, the only indication of a jammed row unit condition is the noise generated by the slipping clutch. Unfortunately, agricultural harvesters are noisy and it can be very difficult to hear this clutch noise.

It would be desirable for an operator to be able to detect a jammed row unit condition before it causes damage to a slip clutch or other portion of the harvester.

SUMMARY

A harvester is disclosed that includes a vehicle body, a harvesting head and a perception system. The harvesting head is coupled to the front of the vehicle body, and the harvesting head includes a drive shaft, row units and slip clutches. The row units process the crops. Each of the slip clutches couples one or more of the row units to the drive shaft and can automatically disengage a jammed row unit from the drive shaft when the jammed row unit becomes jammed. The perception system includes a first vision sensor configured to collect image data in front of the harvesting head, and a perception processor configured to process the image data collected by the first vision sensor. When the perception processor detects an excessive crop buildup in front of one of the row units based on the image data, the perception processor generates a notification to notify the operator of the detected crop buildup.

The first vision sensor can be mounted on the vehicle body or on the harvesting head, and it can be positioned to have a first field of view in front of the harvesting head. The first vision sensor can be a red-green-blue-depth (RGBD) sensor.

The perception system can also include a notification device, and the perception processor can activate the notification device to provide the notification to the operator of the detected crop buildup. The notification device can indicate which one of the row units has the detected crop buildup.

The perception system can also include a second vision sensor configured to collect image data in front of the harvesting head, and the perception processor can be configured to process the image data collected by the first and second vision sensors. The first vision sensor can be positioned to have a first field of view covering a first set of row units of the harvesting head, and the second vision sensor can be positioned to have a second field of view covering a second set of row units of the harvesting head. The first set of row units in the first field of view can overlap the second set of row units in the second field of view.

A method is disclosed for detecting excessive crop buildup in front of row units of a harvesting head, where the harvesting head includes row units configured to process crops. The method includes collecting image data in front of the harvesting head, processing the image data to detect excessive crop buildup in front of one of the row units, and when the perception processor detects excessive crop buildup in front of one of the row units based on the image data, generating a notification to notify the operator of the detected crop buildup. The notification can indicate which one of the row units has the detected crop buildup. Vision sensors can collect the image data in front of the harvesting head, where each of the vision sensors has a field of view covering at least one of the row units of the harvesting head, and the fields of view of the vision sensors cover all of the row units of the harvesting head.

A perception system is disclosed that detects excessive crop buildup in front of row units of a harvesting head. The perception system includes a first vision sensor and a perception processor. The first vision sensor collects image data in front of the row units of the harvesting head. The perception processor processes the image data collected by the first vision sensor. When the perception processor detects an excessive crop buildup in front of one of the row units based on the image data, the perception processor generates a notification to notify the operator of the detected crop buildup.

The perception system can also include a notification device that the perception processor activates to provide the notification to the operator of the detected crop buildup. The notification device can indicate which one of the row units has the detected crop buildup.

The perception system can include multiple vision sensors configured to collect image data in front of the harvesting head. Each of the vision sensors can be positioned to have a field of view that covers at least one of the row units of the harvesting head; and the perception processor can process the image data collected by all of the vision sensors. The fields of view of the vision sensors can cover all of the row units of the harvesting head. The field of view of one of the vision sensors can overlap the field of view of another of the vision sensors.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
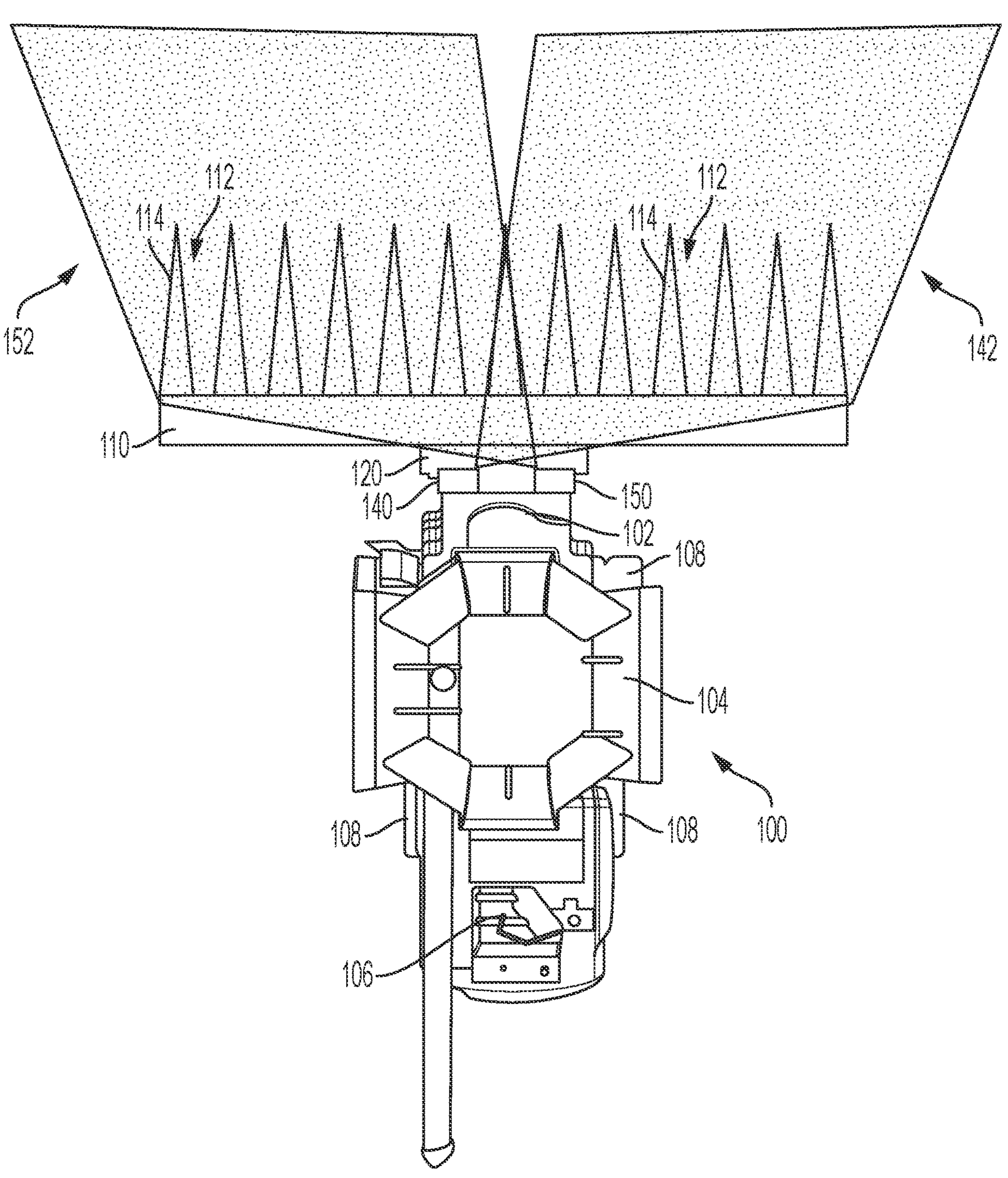
FIG. 1 illustrates an exemplary harvester with a corn head harvesting rows of corn.

FIG. 1 illustrates an exemplary harvester 100 with a vehicle body 102, a corn head 110 and feeder housing 120. The feeder housing 120 couples the corn head 110 and the vehicle body 102 of the harvester 100. The exemplary harvester 100 includes an operator cab 104, an engine 106, and wheels 108. The corn head 110 includes a plurality of row units 112 separated by a plurality of snouts 114 dividing each of the row units 112. The engine 106 provides power for driving the wheels 108 and other driven components of the harvester 100 and corn head 110. Alternatively, the harvester could have track assemblies or other traction devices instead of the wheels 108.

Figure 2:
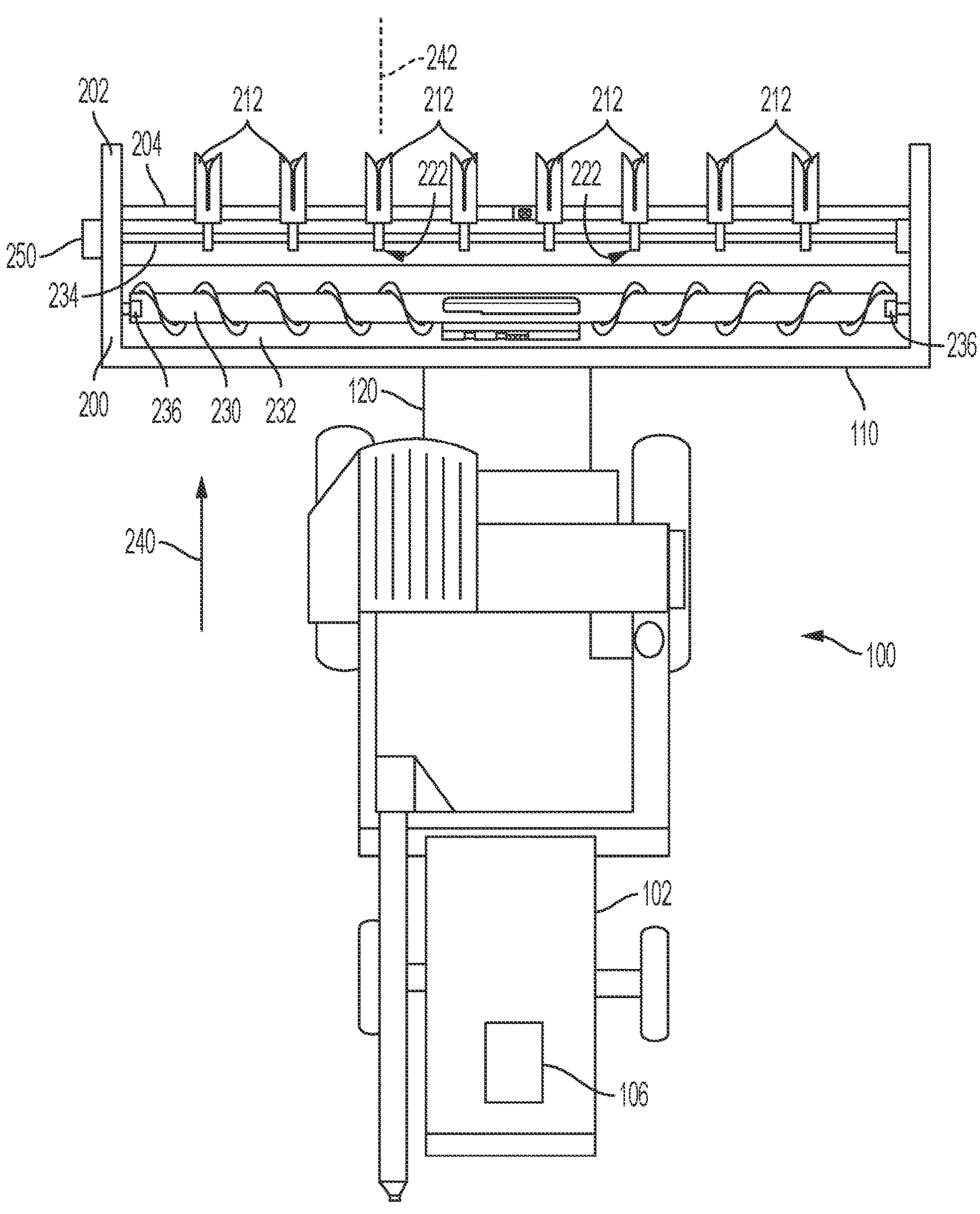
FIG. 2 illustrates the harvester and corn head with the snouts removed to show the components of the underlying row units.

FIG. 2 illustrates the agricultural harvester 100 and the corn head 110 with the snouts 114 removed to show the components of the underlying row units 112. Some conventional row unit details have also been omitted for clarity. The corn head 110 is supported on the vehicle 102 by the feeder house 120. The corn head 110 includes a frame 200, a plurality of row units 212 mounted on the frame 200. An auger 230 disposed in an auger trough 232 and a drive shaft 234 are both mounted on the frame 200. One or more auger clutch 236 can couple the auger 230 with an auger drive shaft that drives the auger 230 so that if all or a portion of the auger 230 gets jammed, then the auger drive shaft can continue rotating, but be mechanically released from the stopped portion of the auger 230 by disengaging the corresponding auger clutch 236 that couples the auger drive shaft to that portion of the auger 230. Disengaging the corresponding auger clutch 236, permits the auger drive shaft to continue rotating even though the portion of the auger 230 is jammed.

The frame 200 has a mainframe 202 and a toolbar 204 that is fixed to the mainframe 202. The toolbar 204 extends across substantially the entire width of the corn head 110. The row units 212 are coupled to toolbar 204 and extend forward from the corn head 110 in a direction of normal forward travel 240, to receive rows of corn plants 242 and process them.

The drive shaft 234 is an elongate member extending the entire width of the corn head 110 and is driven in rotation by a power transmission device 250 located on each side of the corn head 110. The power transmission device 250 in turn, are coupled by a series of conventional mechanical or hydraulic drive elements to engine 106 of the vehicle 102 to be driven thereby. The drive shaft 234 can drive the row units 212, which are located at a series of axially spaced locations across the width of the corn head 110. The drive shaft 234 may be a single piece shaft or it may be divided into multiple shafts coupled to two or more gearboxes.

A plurality of slip clutches 222 are coupled to and between the plurality of row units 212 and drive shaft 234. It will be understood that each of the row units 212 has a corresponding slip clutch 222. The slip clutches 222 may be of various types, including for example slip clutches with teeth, lobes or other slip mechanisms. During normal operation, one or more row units 212 will occasionally become jammed with foreign material and stop operating altogether. When this happens, the drive shaft 234 continues rotating, but is mechanically released from the stopped unit 212 by disengaging the corresponding slip clutch 222 that couples the drive shaft 234 to that row unit 212. Disengaging the corresponding slip clutch 222, permits the drive shaft 234 to continue rotating even though the row unit 212 is jammed. Slippage of the corresponding slip clutch 222 cannot continue indefinitely, however, since a slipping slip clutch can overheat and cause damage in just a few minutes during normal operation. The clutch 222 slips when its corresponding row unit 212 is jammed. If this jammed condition is not detected, a clutch 222 could be damaged or fail in 5 minutes or less.

When a slip clutch 212 disengages, the corresponding row unit 212 stops processing crops which leads to crop material buildup in that row unit 212. As illustrated in FIG. 1, the harvester 100 also includes one or more vision sensors 140, 150 that look in front of the row units 212 of the corn head 110 to identify crop material buildup. The first vision sensor 140 has a first field of view 142 that images in front of the row units 212 in a first section of the corn head 110. The second vision sensor 150 has a second field of view 152 that images in front of the row units 212 in a second section of the corn head 110. There can be any desired number of vision sensors that image in front of the row units 212 of the corn head 110, and there can be overlap between the sections of the corn head 110 imaged by different vision sensors. The vision sensors 140, 150 can be mounted on the operator cab 104, the corn head 110 or in other locations on the vehicle 100. The exemplary embodiment of FIG. 1 shows the first vision sensor 140 mounted on the left side of the operator cab 102, with a first field of view 142 that images in front of the row units 212 on the right side of the corn head 110. The exemplary embodiment of FIG. 1 also shows the second vision sensor 150 mounted on the right side of the operator cab 102, with a second field of view 152 that images in front of the row units 212 on the left side of the corn head 110.

Figure 3:
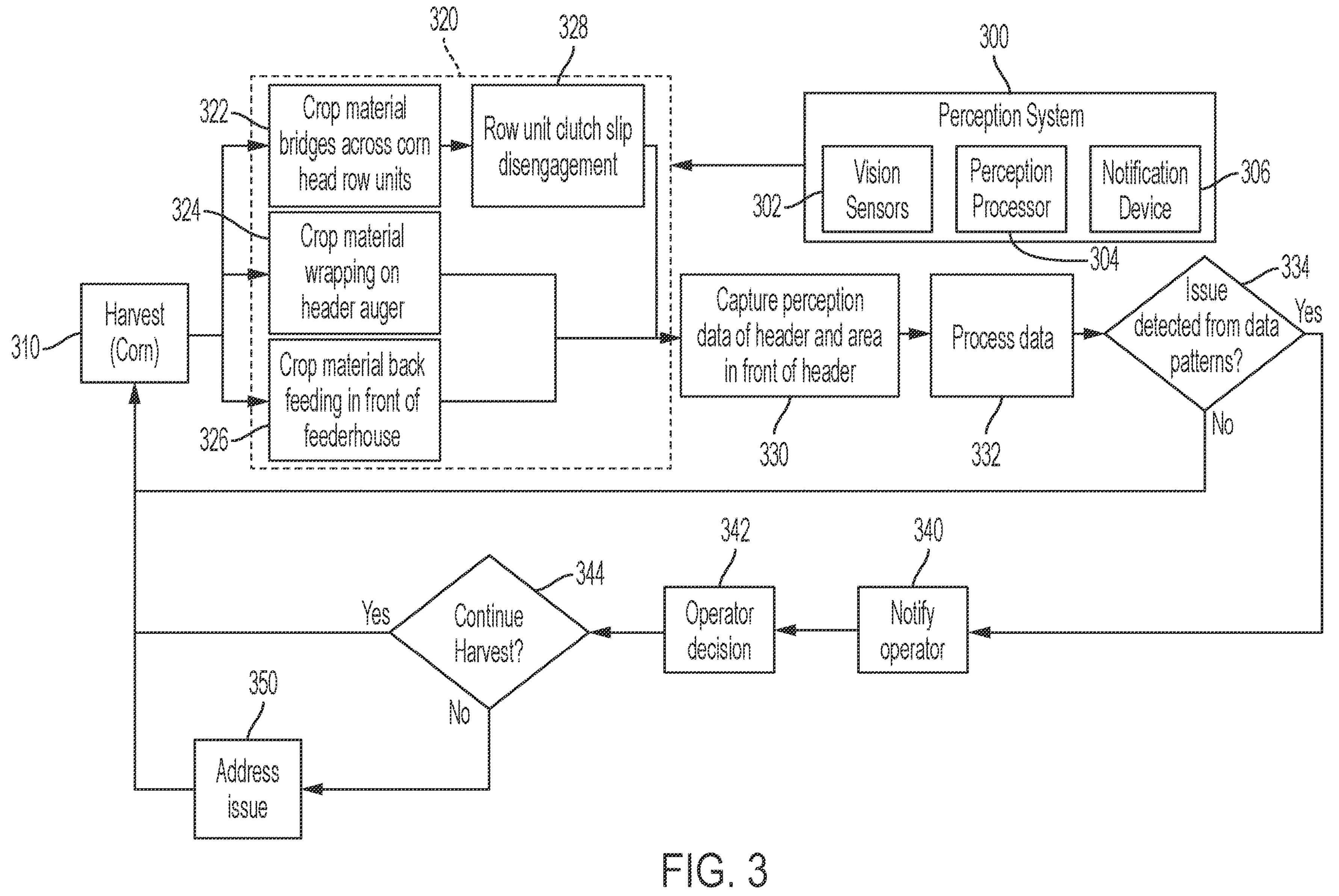
FIG. 3 illustrates an exemplary perception system and flow diagram for the perception system.

FIG. 3 illustrates a perception system 300 that includes one or more vision sensors 302, a perception processor 304 and a notification device 306. Each of the vision sensors 302 images in front of one or more of the row units 212 of the corn head 110. The vision sensors 302 can include one or more types of any of various sensor types, including visible cameras, cameras outside or beyond the visible spectrum, RGBD (red-green-blue-depth) devices, Lidar, etc. The images from the vision sensors 302 are processed by the perception processor 304 to detect and locate corn head row unit slip clutch events. By monitoring crop motion and/or material buildup in front of each of the row units 212, the perception processor 304 can determine the state of the corresponding slip clutches 222 and also detect other perceivable events 320. The perception processor 304 can also use machine learning techniques on the image data from the vision sensors 302 to more effectively identify perceivable events 320, including slip clutch events. When a slip clutch 222 disengages, the corresponding row unit 212 stops processing crop and crop material begins to build up in front of the corresponding row unit 212 of the corn head 110. The perception processor 304 can detect this crop material build up between two adjacent shrouds 114 in front of the corresponding row unit 112 on the image data from the vision sensors 302 and notify the operator to take action or make a decision. The perception processor 304 can notify the operator using the notification device 306, which can activate a visual, audio, vibratory or other operator alert. The ability of the perception system 300 to detect a slip clutch event within about 30 seconds of it happening would be useful to prevent gear case damage to the row unit.

FIG. 3 illustrates an exemplary flow diagram for the perception system 300 with vision sensors 302, perception processor 304 and notification device 306. At block 310, the harvest begins and the perception system 300 is active. The vision sensors 302 image in front of the row units 112 to detect a perceivable issue 320.

Examples of perceivable issues 320 include a crop material bridging across a corn head row unit 112 event 322, a crop material wrapping on the header auger 230 event 324, a crop material back feeding in front of the feeder house 120 event 326, etc. The crop material bridging across a corn head row unit event 322 usually presents as crop material building up between two adjacent shrouds 114 in front of a single corn head row unit 112. The crop material wrapping on the header auger 230 event 324 usually presents as crop material building up between multiple adjacent shrouds 114 of the corn head 110. The crop material back feeding in front of the feeder house 120 event 326 usually presents as crop material building up primarily between the central shrouds 114 of the corn head 110. The perception processor 304 can be configured to distinguish between the various perceivable issues 320 and take action based on what perceivable issue 320 is detected.

The crop material bridges across a corn head row unit 112 event 322 usually indicates a slip clutch event 328 where the slip clutch 222 of the row unit 112 has disengaged. At block 330, the vision sensors 302 capture perception data of the header 110 and their fields of view in front of the header 110. At block 332, the perception processor 304 processes the image data captured by the vision sensors 302. At block 334, the perception processor 304 determines whether a perceivable issue 320 is detected by the processed image data. If no perceivable issue 320 is detected, the harvest continues at block 310 and the perception system 300 continues capturing and processing image data in front of the row units 112 to detect perceivable issues 320. If an perceivable issue 320 is detected, control passes to block 340.

At block 340, the perception processor 304 notifies the operator using the notification device 306 that a perceivable issue 320 has been detected. Any of various notification devices 306 can be used, including a light, an audible alarm, an operator seat or control device vibrator, an operator display screen, etc., or combinations of the above. The perception processor 304 can be configured to distinguish between the different perceivable issues 320, and can be configured to use different notification methods depending on the type of perceivable issue 320 detected. At block 342, the operator decides what, if any, action to take based on the notification that the perceivable issue 320 has been detected. At block 344, the operator determines whether to continue the harvest in view of the notification that the perceivable issue 320 has been detected. If the operator determines to continue the harvest regardless of the notification of the perceivable issue 320, control passes to block 310 and the harvest continues. If the operator determines to stop the harvest and address the issue, control passes to block 350.

After the issue has been addressed at block 350, control passes to block 310 and the harvest continues.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A harvester controlled by an operator and configured to harvest crops, the harvester comprising:

a vehicle body;

a harvesting head coupled to the front of the vehicle body, the harvesting head comprising:

a drive shaft;

a plurality of row units configured to process the crops; and a plurality of slip clutches; each of the plurality of slip clutches configured to couple at least one of the plurality of row units to the drive shaft and to automatically disengage a jammed row unit of the plurality of row units from the drive shaft when the jammed row unit becomes jammed; and a perception system comprising:

a first vision sensor configured to collect image data in front of the harvesting head; and a perception processor configured to:

process the image data collected by the first vision sensor;

identify, from a plurality of types of perceivable issues, using the image data, a detected perceivable issue;

generate a notification instruction in response to the detected perceivable issue, wherein the perception processor identifies the type of perceivable issue based on an identification of a characteristic of crop buildup in front of one of the plurality of row units based on the image data, and wherein the plurality of types of perceivable issues comprises: crop buildup bridging across a row unit of the plurality of row units; crop buildup wrapping between a pair of adjacent shrouds of the harvesting head; and, crop buildup building up between the pair of adjacent shrouds.

2. The harvester of claim 1, wherein the first vision sensor is mounted on the vehicle body and is positioned to have a first field of view in front of the harvesting head.

3. The harvester of claim 1, wherein the first vision sensor is mounted on the harvesting head and is positioned to have a first field of view in front of the harvesting head.

4. The harvester of claim 1, wherein the first vision sensor is a red-green-blue-depth (RGBD) sensor.

5. The harvester of claim 1, wherein the perception system further comprises a notification device, and the perception processor activates the notification device in response to the notification instruction to provide a notification to the operator of the detected perceivable issue.

6. The harvester of claim 5, wherein the notification device indicates the one of the plurality of row units with the detected perceivable issue.

7. The harvester of claim 1, wherein the perception system further comprises a second vision sensor configured to collect image data in front of the harvesting head, and the perception processor is configured to process the image data collected by the first and second vision sensors.

8. The harvester of claim 7, wherein the first vision sensor is positioned to have a first field of view covering a first set of row units of the harvesting head, and the second vision sensor is positioned to have a second field of view covering a second set of row units of the harvesting head.

9. The harvester of claim 8, wherein the first set of row units in the first field of view overlaps the second set of row units in the second field of view.

10. The harvester of claim 7, wherein the perception system further comprises a notification device, and the perception processor activates the notification device to provide the notification to the operator of the detected crop buildup.

11. The harvester of claim 10, wherein the notification device is configured to indicate, in response to the notification instruction, the one of the plurality of row units with the detected perceivable issue.

12. A method for detecting crop buildup in front of row units of a harvesting head, the method comprising:
- collecting image data in front of the harvesting head, the harvesting head comprising a plurality of row units configured to process crops;
- processing the image data to detect crop buildup in front of one of the plurality of row units;
- identifying, from a plurality of types of perceivable issues, and using the processed image data, a detected perceivable issue in front of a row unit of the plurality of row units;
- outputting, through a notification device, a notification to notify an operator of the detected perceivable issue;
- automatically disengaging the row unit from a drive shaft in response to the row unit becoming jammed by the detected crop buildup, and
- wherein the plurality of types of perceivable issues comprises: crop buildup bridging across a row unit of the plurality of row units;
- crop buildup wrapping between a pair of adjacent shrouds of the harvesting head; and, crop buildup building up between the pair of adjacent shrouds.

13. The method of claim 12, wherein the outputting of the notification comprises indicating the row unit with the detected perceivable issue, and outputting the notification via the identified notification method.

14. The method of claim 12, wherein collecting image data in front of the harvesting head comprises collecting image data from a plurality of vision sensors, each of the plurality of vision sensors having a field of view covering at least one of the plurality of row units of the harvesting head, and the fields of view of the plurality of vision sensors covering all of the plurality of row units of the harvesting head.

15. A harvester having a perception system configured to detect crop buildup in front of row units of a harvesting head, the perception system comprising:
- a first vision sensor configured to collect image data in front of the harvesting head, the harvesting head comprising a plurality of row units configured to process crops; and
- a perception processor configured to process the image data collected by the first vision sensor;
- wherein the perception processor is configured to:
- detect crop buildup in front of one of the plurality of row units based on the image data,
- identify, using the image data and from a plurality of types of perceivable issues, a detected perceivable issue in front of a row unit of the plurality of row units,
- generate a notification to notify an operator of the detected perceivable issue,
- wherein the harvester is configured to automatically disengage the row unit from a drive shaft of the harvester in response to the row unit becoming jammed by crop buildup, and
- wherein the plurality of types of perceivable issues comprises: crop buildup bridging across a row unit of the plurality of row units; crop buildup wrapping between a pair of adjacent shrouds of the harvesting head; and, crop buildup building up between the pair of adjacent shrouds.

16. The harvester of claim 15, further comprising a notification device, and wherein the perception processor is configured to:
- activate the notification device to provide the notification, via the notification method, to the operator of the detected perceivable issue.

17. The harvester of claim 16, wherein the notification device is configured to indicate the row unit with the detected perceivable issue.

18. The harvester of claim 16, wherein the perception system further comprises a plurality of vision sensors configured to collect image data in front of the harvesting head, the first vision sensor being one of the plurality of vision sensors;
- wherein each of the plurality of vision sensors is positioned to have a field of view that covers at least one of the plurality of row units of the harvesting head; and the perception processor is configured to process the image data collected by all of the plurality of vision sensors.

19. The harvester of claim 18, wherein the fields of view of the plurality of vision sensors cover all of the plurality of row units of the harvesting head.

20. The harvester of claim 19, wherein the field of view of at least one of the plurality of vision sensors overlaps the field of view of another of the plurality of vision sensors.

21. The method of claim 15, wherein the perception processor is further configured to identify a notification method associated with the detected perceivable issue.

* * * * *